United States Patent
Weber

(10) Patent No.: US 8,757,361 B2
(45) Date of Patent: Jun. 24, 2014

(54) APPARATUS WITH PRODUCT CONVEYOR AND TRANSVERSE DRIVE

(75) Inventor: Günther Weber, Groβ Nemerow (DE)

(73) Assignee: Weber Maschinenbau GmbH Breidenbach (DE)

( * ) Notice: Subject to any disclaimer, the term of this patent is extended or adjusted under 35 U.S.C. 154(b) by 293 days.

(21) Appl. No.: 13/248,253

(22) Filed: Sep. 29, 2011

(65) Prior Publication Data

US 2012/0103761 A1    May 3, 2012

(30) Foreign Application Priority Data

Sep. 29, 2010  (EP) ..................................... 10011822

(51) Int. Cl.
 *B65G 21/00*     (2006.01)
(52) U.S. Cl.
 USPC ................. 198/631.1; 198/369.1; 198/457.01; 74/64
(58) Field of Classification Search
 USPC ................. 198/369.1, 457.01, 457.03, 621.1, 198/631.1, 750.14; 74/61, 64; 83/23, 88, 83/155, 158
 See application file for complete search history.

(56) References Cited

U.S. PATENT DOCUMENTS

| | | | |
|---|---|---|---|
| 5,802,803 A * | 9/1998 | Kitagawa et al. ................. | 53/54 |
| 6,248,013 B1 * | 6/2001 | Thomas et al. ............... | 452/149 |
| 6,715,947 B1 | 4/2004 | Cornelius et al. | |
| 6,763,750 B2 * | 7/2004 | Lindee .............. | 83/88 |
| 6,935,215 B2 * | 8/2005 | Lindee et al. ..................... | 83/74 |
| 7,581,474 B2 * | 9/2009 | Weber .............................. | 83/29 |
| 2003/0145700 A1 | 8/2003 | Lindee | |
| 2004/0031363 A1 | 2/2004 | Lindee et al. | |

FOREIGN PATENT DOCUMENTS

| | | |
|---|---|---|
| DE | 102006007496 A1 | 8/2007 |
| EP | 0634325 A1 | 1/1995 |
| WO | 0059690 A1 | 10/2000 |

OTHER PUBLICATIONS

European Search Report (with English Translation) dated Mar. 15, 2011, for European Patent Application No. 10011822.3.

\* cited by examiner

*Primary Examiner* — Douglas Hess
(74) *Attorney, Agent, or Firm* — Cantor Colburn LLP

(57) ABSTRACT

The present invention relates to an apparatus having a product conveyor drivable in a conveying direction and a transverse drive by which the product conveyor is movable in a direction transverse to the conveying direction. The product conveyor is coupled to a compensation mass by means of which forces can be compensated which occur by a transverse movement of the product conveyor.

13 Claims, 6 Drawing Sheets

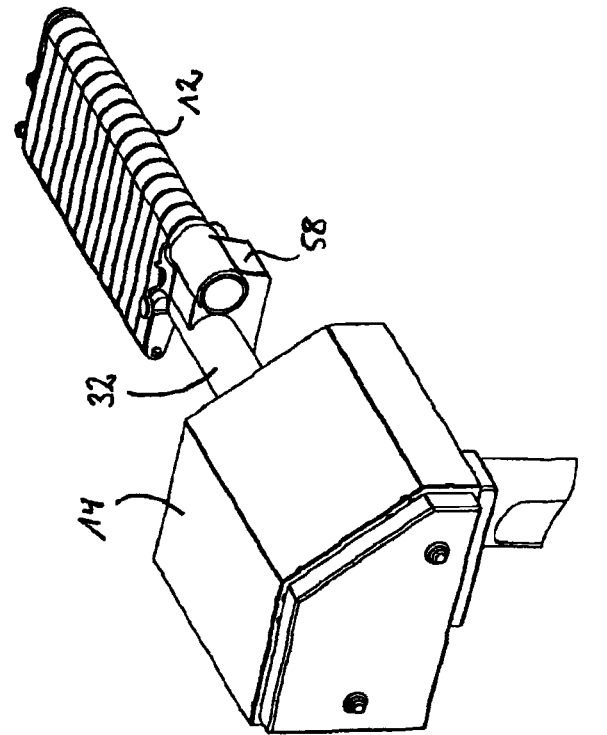
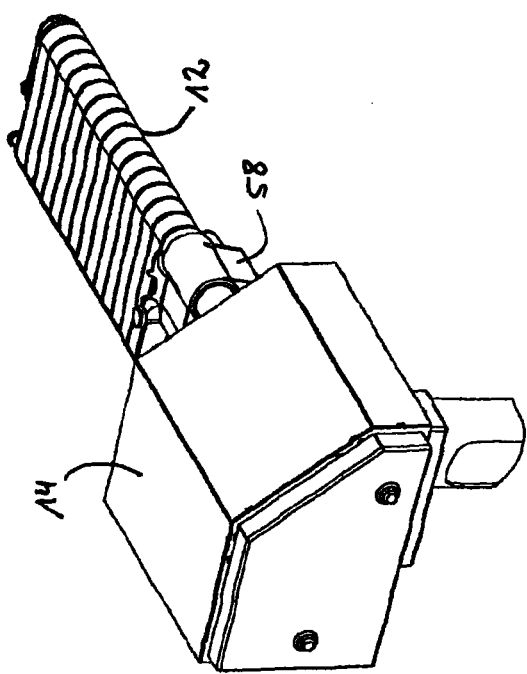
Fig. 2

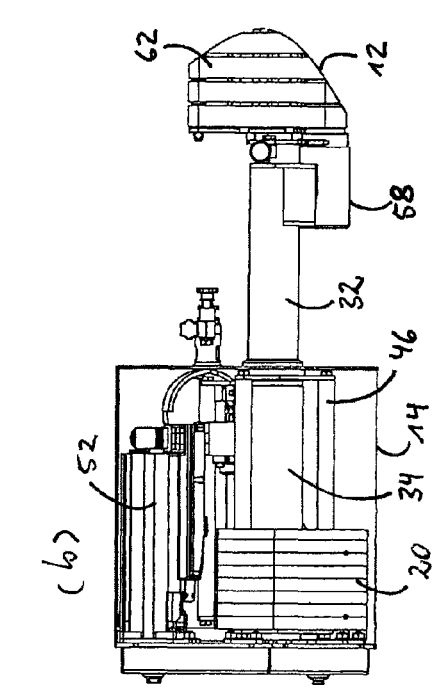
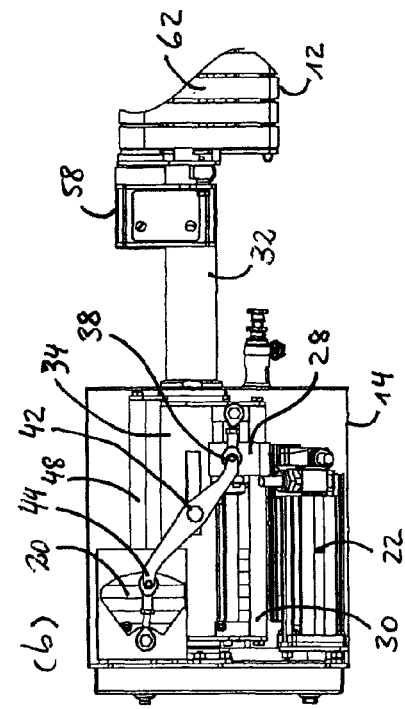
Fig. 3
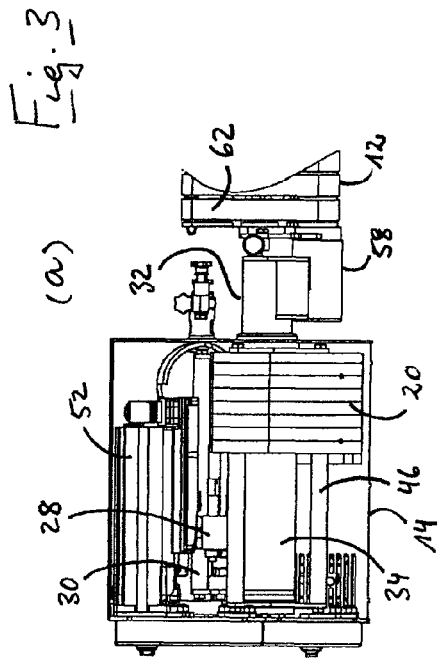
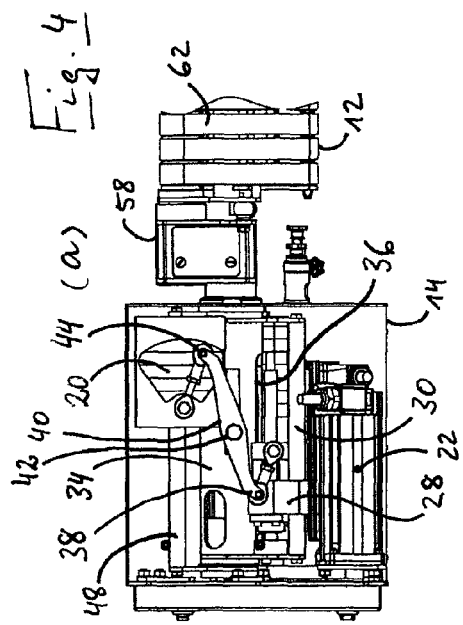
Fig. 4

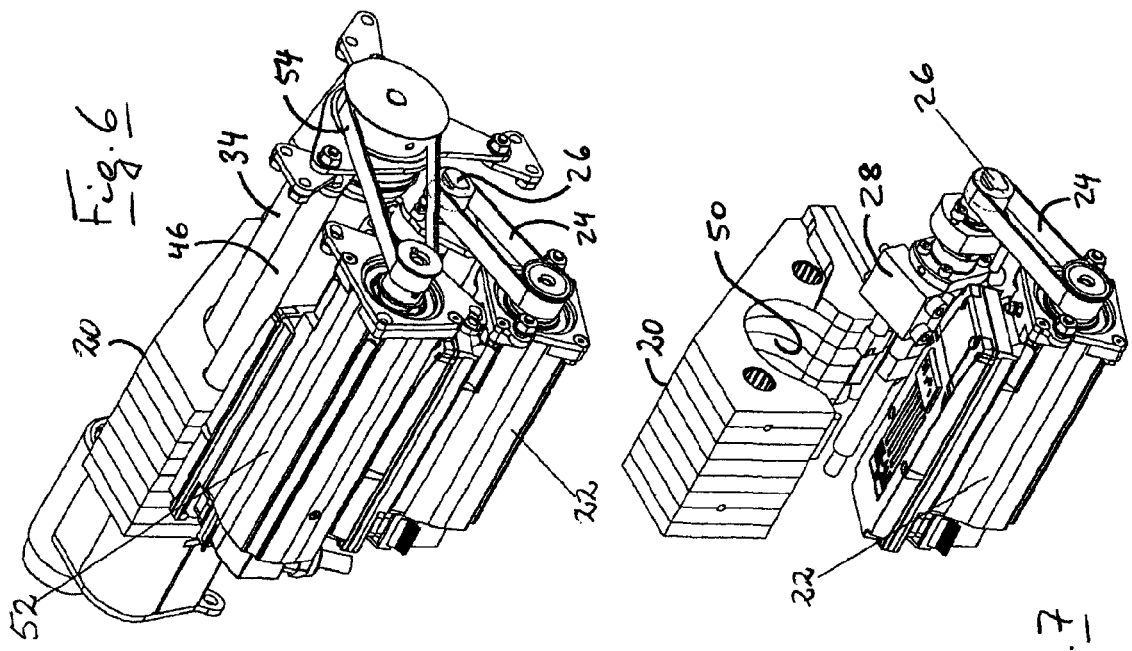
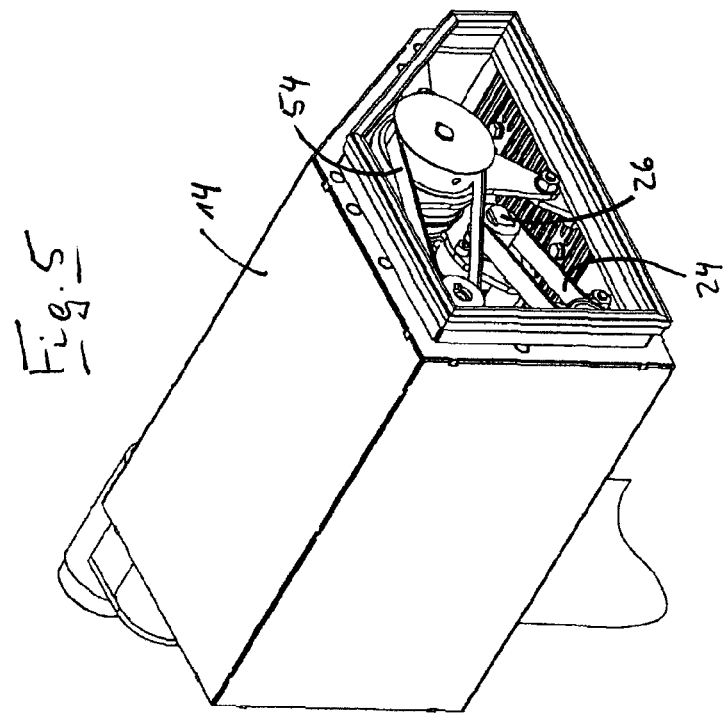

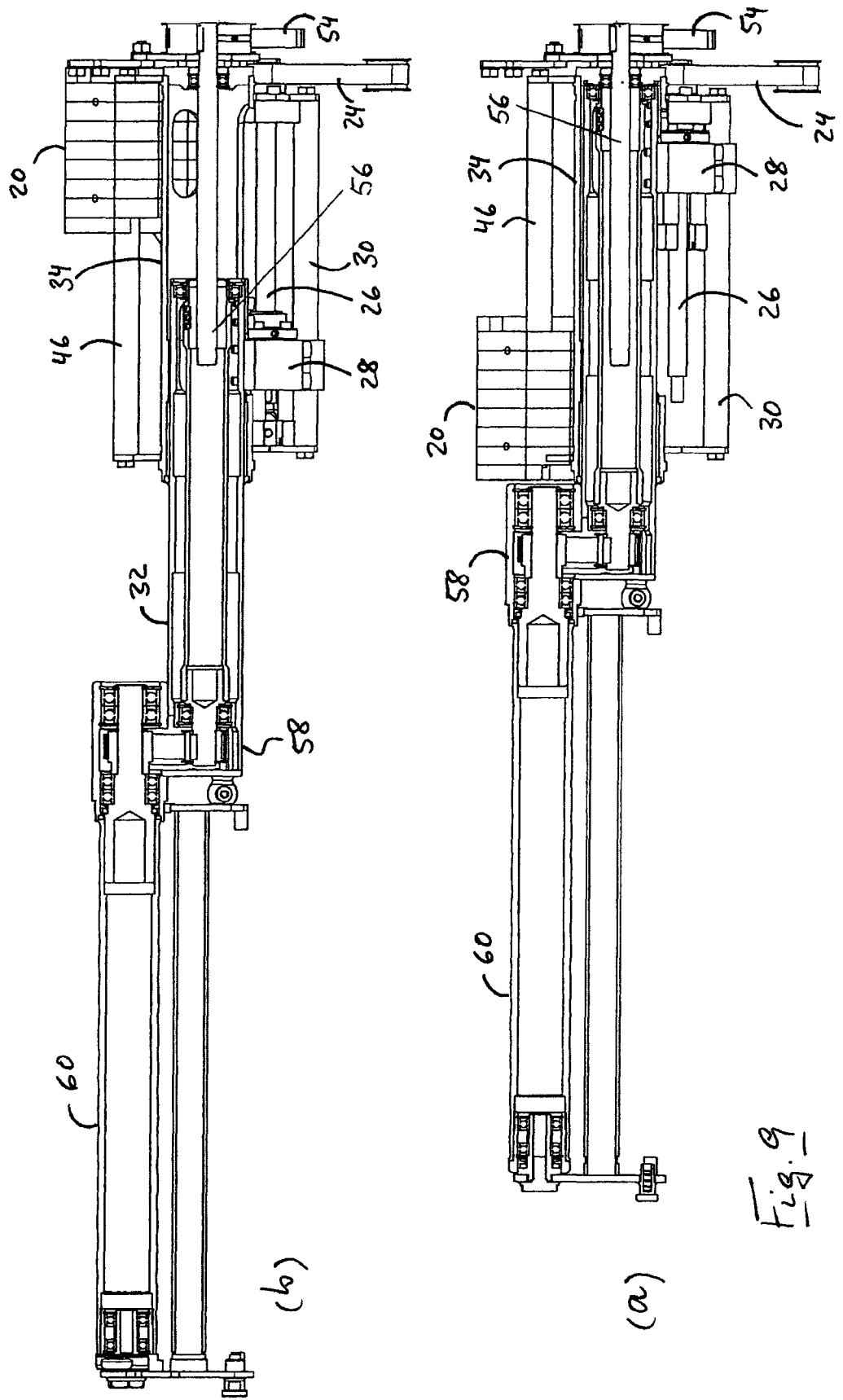

APPARATUS WITH PRODUCT CONVEYOR AND TRANSVERSE DRIVE

The present invention relates to an apparatus having a product conveyor drivable in a conveying direction and a transverse drive by which the product conveyor is movable in a direction transverse to the conveying direction.

BACKGROUND OF THE INVENTION

An apparatus of having a product conveyor is generally known and is used, for example, in conjunction with a cutting machine for slicing food products to allow an overlapping arrangement, a so-called "transverse overlapping", of product slices which are cut off from a food product by the cutting machine.

Forces occur in the apparatus due to the transverse movement of the product conveyor as a whole which not only require a correspondingly sufficient dimensioning of support points for supporting the product conveyor, but which can also set the apparatus as a whole into unwanted vibrations. The problem of unwanted vibrations is above all pronounced in smaller apparatus whose mass is not sufficient to compensate the forces caused by the transverse movement of the product conveyor, in particular when it is a question of faster transverse movements. Unwanted vibrations could previously only be avoided in such apparatus by a reduction in the amplitude and/or frequency of the transverse movement.

SUMMARY OF THE INVENTION

It is the underlying feature of the invention to provide an apparatus of the initially named kind which overcomes the problem of unwanted vibrations caused by the transverse movement of the product conveyor.

This feature is satisfied by an apparatus having a product conveyor drivable in a conveying direction and a transverse drive by which the product conveyor is movable in a direction transverse to the conveying direction. In particular in that the product conveyor is coupled to a compensation mass by means of which forces arising by a transverse movement of the product conveyor can be compensated.

The compensation mass forms a counterweight to the product conveyor by which forces caused by the transverse movement of the product conveyor are compensated and vibrations in the apparatus resulting therefrom are at least almost completely prevented. In other words, the smooth running of the apparatus is increased by the coupling of the product conveyor and the balance mass. The equipping of the apparatus with an additional compensation mass provided especially for this purpose thus makes it possible also to realize faster transverse movements and/or transverse movements with a greater amplitude without risk even in smaller apparatus. Accordingly, the amplitude and/or frequency of the transverse movement of the product conveyor can also be increased in larger apparatus.

All movements and/or directions are to be understood as "transverse movement" and "transverse direction" in this context which do not extend parallel to the conveying direction, i.e. that is at an angle greater than 0° to the conveying direction.

Advantageous embodiments of the invention can be seen from the dependent claims, from the description and from the drawing.

In accordance with an embodiment, the compensation mass is movably, in particular displaceably, supported.

In this respect, the compensation mass is in an exemplary embodiment, coupled to the product conveyor by a coupling mechanism such that a transverse movement of the product conveyor results in a movement, in particular a synchronous movement, of the compensation mass in the direction opposite to the product conveyor. The compensation mass is in other words moved opposite to the product conveyor such that forces resulting from the transverse movement of the product conveyor, on the one hand, and the forces caused by the correspondingly opposite movement of the compensation mass at least largely cancel one another out. Consequently no forces arise which could set the apparatus as a whole into vibration.

In accordance with a further embodiment, the coupling mechanism includes a two-sided lever whose one end is connected to the compensation mass and whose other end is connected to the transverse drive. The transport drive, in other words, therefore not only provides the transverse movement of the product conveyor, but simultaneously also the movement of the compensation mass. In this respect, such a lever mechanism represents a particularly simple mechanism for moving the compensation mass.

In an exemplary embodiment, the lever is pivotable about an axis which is orientated at right angles to the transverse movement of the product conveyor and/or to the direction of movement of the compensation mass.

The lever is advantageously pivotally connected to the compensation mass in the region of its one end. In the region of its other end, the lever is, in an exemplary embodiment, pivotally connected to a spindle nut receiver or a threaded nut which is in engagement with a threaded spindle of the transverse drive.

In this respect, the threaded nut can be fixedly connected to a part of a carrier structure of the product conveyor which is displaceable in the direction of the transverse movement relative to a fixed part of the carrier structure. The displaceable part of the carrier structure can in this respect form a carrier arm for the product conveyor movable to and fro. Specifically, the product conveyor can be attached to the carrier arm at an end of the carrier arm remote from the compensation mass.

The compensation mass is advantageously made so that the center of gravity of the compensation mass and the center of gravity of the displaceable part of the carrier structure lie on an axis which extends substantially in the direction of the transverse movement. It is hereby ensured that the forces resulting from the transverse movements of the product conveyor and the compensation mass are aligned at least approximately coaxially. Unwanted torques which could occur as a consequence of forces acting offset with respect to one another are thus avoided, which ultimately contributes to an even better running smoothness of the apparatus.

The compensation mass can surround the fixed part of the carrier structure, for example seen in the peripheral direction, at least section-wise for this purpose.

When the mass of the compensation mass and the mass of the product conveyor are of equal magnitude, the compensation mass and the product conveyor are, in an exemplary embodiment, moved by equal path amounts in the transverse direction for an ideal force compensation. The mass of the compensation mass can, however, generally also be smaller than the mass of the product conveyor, in which case the compensation mass for an ideal force compensation would have to cover a longer path in the transverse direction than the product conveyor. Conversely, the compensation mass, in the case that its mass is larger than that of the product conveyor, would have to be moved by a smaller amount in the transverse direction for an ideal force compensation.

Furthermore, it is within the framework of the invention that the forces caused by the transverse movement of the product conveyor are only partly compensated by the compensation mass, for example when a compensation mass having a mass which is ambler than the mass of the product conveyor is not moved by a sufficiently large distance in the transverse direction, e.g. only as far as or less far than the product conveyor. In this case, the forces caused by the transverse movement of the product conveyor would be partly taken up by a basic structure of the apparatus which would in turn therefore have to have a sufficient mass to prevent vibrations in the apparatus result from the transverse movement of the product conveyor at least almost completely.

BRIEF DESCRIPTION OF THE DRAWINGS

The invention will be described in the following purely by way of example with reference to exemplary embodiments and to the accompanying drawing in which:

FIG. 2 is a perspective view of the drive housing and of the product conveyor of FIG. 1(a) in the retracted state and (b) in the extended state of the product conveyor;

FIG. 3 is a view from above of the drive and of the product conveyor of FIG. 1(a) in the retracted state and (b) in the extended state, in each case with an open drive housing;

FIG. 4 is a view from below of the drive and of the product conveyor of FIG. 1(a) in the retracted state and (b) in the extended state, in each case with an open drive housing;

FIG. 5 is a perspective view of the drive housing with an open side cover;

FIG. 6 is a perspective view of a conveyor drive for the product conveyor of a transverse drive for the product conveyor and of a compensation mass;

FIG. 7 is the view of FIG. 6 without the conveyor drive;

FIG. 9 is a sectional view of the components of FIG. 8(a) in the retracted state and (b) in the extended state of the product conveyor.

DETAILED DESCRIPTION

A conveying apparatus is shown in the Figures which can be positioned after a cutting machine for the slicing of food products to transport off product slices which are cut off from a food product by the cutting machine.

Figure 1:
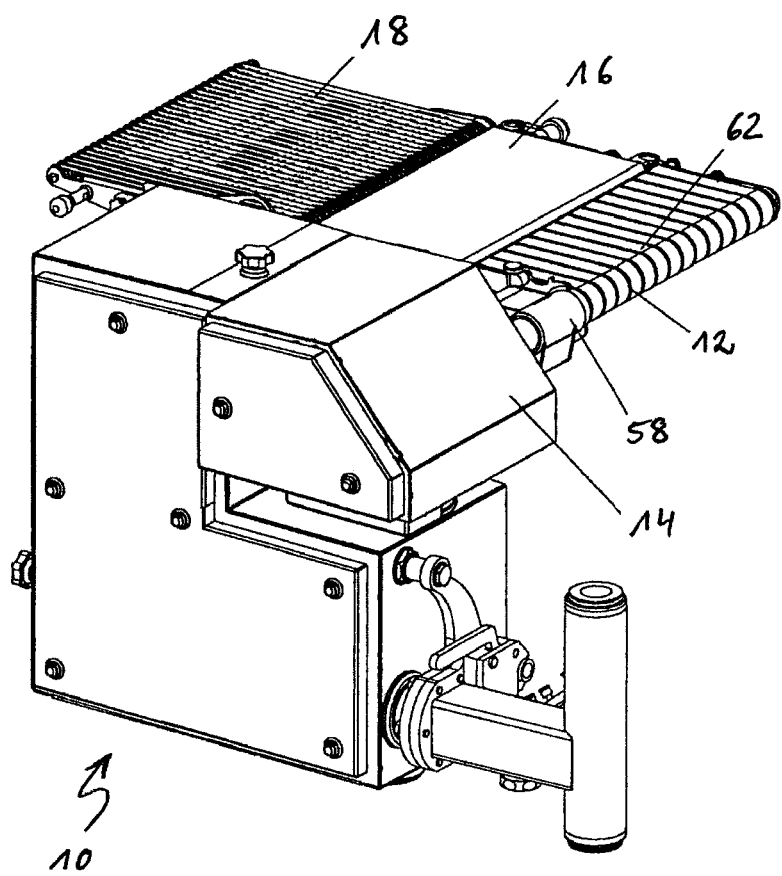
FIG. 1 is a perspective view of an apparatus in accordance with the invention with a product conveyor and a drive housing accommodating a drive for the product conveyor.

As FIG. 1 shows, the apparatus includes a basic structure 10, a product conveyor 12 as well as a drive accommodated in a drive housing 14 for the product conveyor 12. Two further conveying devices 16, 18 are positioned downstream of the product conveyor 12 viewed in the conveying direction.

To allow an arrangement of product slices cut off from a food product by the cutting machine overlapping in the conveying direction, conveyor belts 62 of the product conveyor 12 can be moved in the conveying direction during the cutting procedure. To achieve a transversely overlapping arrangement of the product slices, the product conveyor 12 can additionally be moved in a direction transverse to the conveying direction. In FIG. 2a, the product conveyor 12 is shown in a position maximally retracted in the transverse direction and in FIG. 2b in a maximally extended position. The product conveyor 12 is usually moved to and fro between a retracted position and an extended position at a speed adapted to the cutting speed of the cutting machine.

As FIGS. 3 and 4 show, the product conveyor 12 is coupled to a compensation mass 20 accommodated in the drive housing 14, and indeed such that the compensation mass 20 is always moved in the direction opposite to the product conveyor 12. Forces resulting from the transverse movement of the product conveyor 12 which could otherwise cause unwanted vibrations in the apparatus are compensated by the compensation mass 20.

The transverse movement of the product conveyor 12 and the compensation mass 20 takes place by means of a transverse drive motor 22 accommodated in the drive housing 14 (FIGS. 4, 6, 7) which drives a threaded spindle 26 via a drive belt 24. The threaded spindle 26 is in engagement with a spindle nut, not shown, which moves forward and backward in the transverse direction in dependence on the direction of rotation of the threaded spindle 26. The spindle nut is accommodated in a spindle nut receiver 28 which is supported displaceable in the transverse direction at a guide bar 30.

For the transverse movement of the product conveyor 12, the spindle nut receiver 28 is fixedly connected to a tubular carrier arm 32 which has an end which projects from the drive housing 14 and in whose region the product conveyor 12 is attached. The product conveyor 12 is in other words carried by the carrier arm 32.

The carrier arm 32 is supported displaceable in the transverse direction in a fixed position carrier pipe 34 arranged in the drive housing 14. So that the spindle nut receiver 28 can engage at the carrier arm 32 supported in the carrier pipe 34, the carrier pipe 34 has a longitudinal opening 36 which extends in the axial direction.

The spindle nut receiver 28 is moved in the transverse direction by a rotation of the threaded spindle 26 and the carrier arm 32 and thus ultimately the product conveyor 12 is hereby moved in the transverse direction.

As FIG. 4 shows, the spindle nut receiver 28 is pivotally connected at its lower side to the one end 38 of a two-sided lever 40 which is rotatably supported about an axis at right angles to the transverse direction, in the present embodiment variant a vertical axis 42. The other end 44 of the lever 40 is pivotally connected to the compensation balance 20 which is supported displaceable in the transverse direction on two guide bars 46, 48.

It is ensured by the coupling of the compensation mass 20 and the spindle nut receiver 28 via the lever 40 that the compensation mass 20 moves synchronously with the spindle nut receiver 28 and consequently with the carrier arm 32 and the product conveyor 12, and indeed always in the opposite direction.

It can be recognized in FIG. 7 that the balance mass 20 has a cut-out 50 which extends in the transverse direction and which gives the compensation mass 20 an approximately U-shaped cross-section. The profile of the cut-out 50 is a little larger than the profile of the carrier pipe 34, which makes it possible to arrange the compensation mass 20 around the carrier pipe 34 so that the center of gravity of the compensation mass 20 and the center of gravity of the carrier arm 32 lie on an axis which extends at least approximately in the transverse direction.

Figure 8:
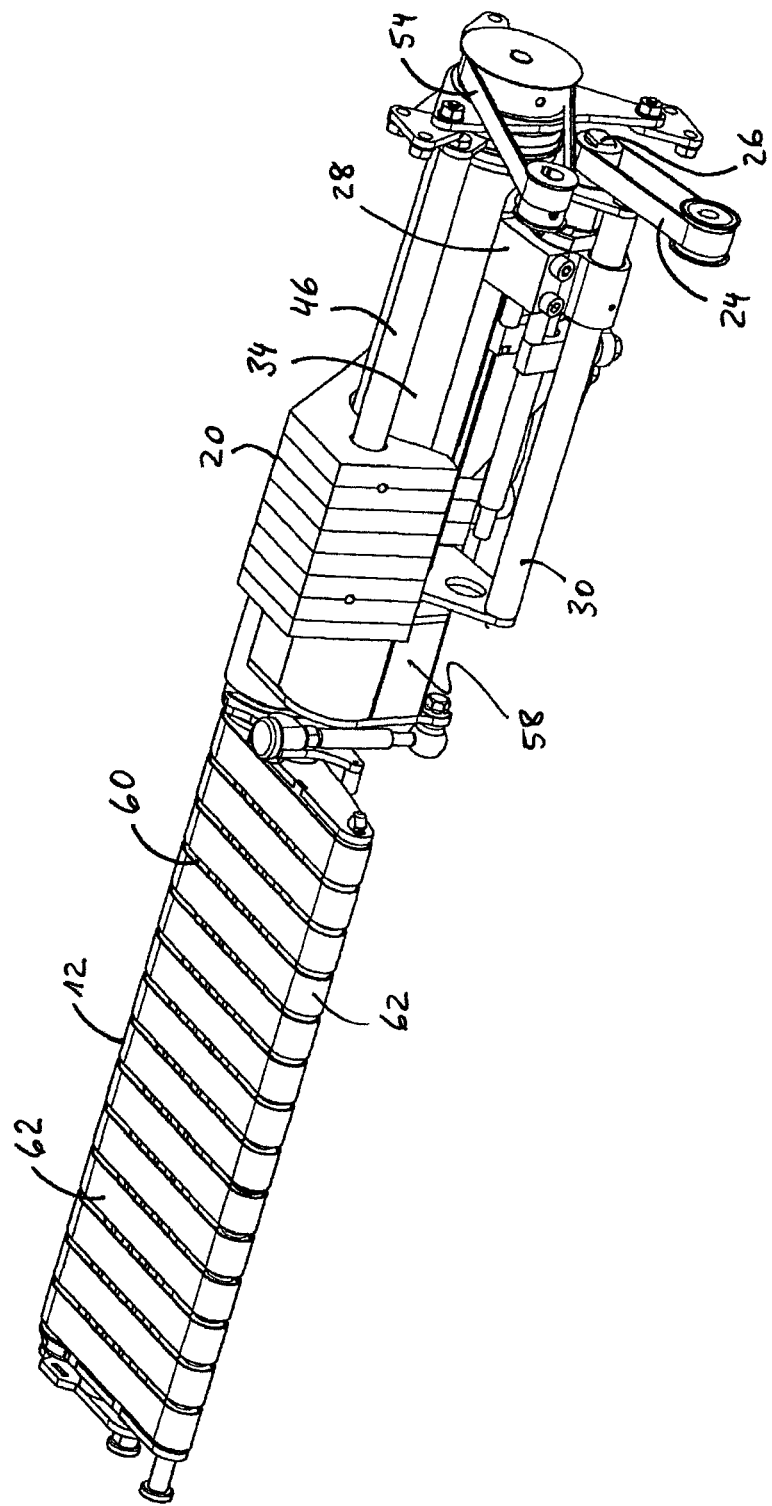
FIG. 8 is a perspective view of the product conveyor and of parts of its drive.

In addition to the transverse drive motor 22, a conveyor drive motor 52 is moreover accommodated in the drive housing 14 (FIG. 6) and serves to drive the product conveyor 12 in the conveying direction. The conveyor drive motor 52 drives, via a drive belt 54, a drive shaft 56 which extends in the carrier pipe 34 and whose torque is transmitted via the carrier arm 32 and a displacement gear 58 provided at the end of the carrier arm 32 to a drive roller 60 of the product conveyor 12 (FIGS. 8 and 9). Strip-shaped conveyor belts 62 of the product conveyor 12 led around the drive roller 60 are moved in the conveying direction by the rotation of the drive roller 60.

It is understood that the product conveyor 12 can also have conveyor bands or a conveyor belt extending over substantially the whole width of the product conveyor 12 instead of the strip-shaped conveyor belts 62 shown in the Figures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An apparatus comprising:
a product conveyor drivable in a conveying direction;
a transverse drive by which the product conveyor is movable in a direction transverse to the conveying direction; and
a compensation mass coupled to the product conveyor that compensates forces caused by a transverse movement of the product conveyor.

2. An apparatus in accordance with claim 1, wherein the compensation mass is movably supported.

3. An apparatus in accordance with claim 1, wherein the compensation mass is displaceably supported.

4. An apparatus in accordance with claim 1, wherein the compensation mass is coupled to the product conveyor by a coupling mechanism such that a transverse movement of the product conveyor results in a movement of the compensation mass in the direction opposite to the product conveyor.

5. An apparatus in accordance with claim 4, wherein the movement of the compensation mass in the direction opposite to the product conveyor is synchronous with the transverse movement of the product conveyor.

6. An apparatus in accordance with claim 4, wherein the coupling mechanism includes a two-armed lever whose one end is connected to the compensation mass and whose other end is connected to the transverse drive.

7. An apparatus in accordance with claim 6, wherein the lever is pivotable about an axis which is orientated at right angles to the transverse movement direction of the product conveyor and/or to the direction of movement of the compensation mass.

8. An apparatus in accordance with claim 6, wherein the lever is pivotally connected to the compensation balance in the region of its one end.

9. An apparatus in accordance with claim 6, wherein the lever is pivotally connected in the region of its other end to a spindle nut receiver or threaded nut which is in engagement with a threaded spindle of the transverse drive.

10. An apparatus in accordance with claim 9, wherein the threaded nut is fixedly connected to a part of a carrier structure for the product conveyor which is displaceable in the direction of the transverse movement relative to a fixed part of the carrier structure.

11. An apparatus in accordance with claim 1, wherein the compensation balance is made so that the center of gravity of the compensation mass and the center of gravity of a displaceable part of a carrier structure for the product conveyor lie on an axis which extends substantially in the direction of the transverse movement.

12. An apparatus in accordance with claim 1, wherein the compensation mass surrounds a fixed part of a carrier structure for the product conveyor at least section-wise viewed in the peripheral direction.

13. An apparatus comprising:
a product conveyor comprising a conveyor belt drivable in a conveying direction;
a transverse drive by which the product conveyor is movable in a direction transverse to the conveying direction; and
a compensation mass coupled to the product conveyor that compensates forces caused by a transverse movement of the product conveyor.

* * * * *